US012196519B1

(12) United States Patent
Stilwell, III

(10) Patent No.: US 12,196,519 B1
(45) Date of Patent: Jan. 14, 2025

(54) REMOTE LIGHT ACTIVATION FROM SIDE ARM

(71) Applicant: James E. Stilwell, III, Strafford, MO (US)

(72) Inventor: James E. Stilwell, III, Strafford, MO (US)

( * ) Notice: Subject to any disclaimer, the term of this patent is extended or adjusted under 35 U.S.C. 154(b) by 127 days.

(21) Appl. No.: 18/112,112

(22) Filed: Feb. 21, 2023

Related U.S. Application Data

(60) Provisional application No. 63/320,731, filed on Mar. 17, 2022, provisional application No. 63/311,972, filed on Feb. 19, 2022.

(51) Int. Cl.

| | |
|---|---|
| ***F41G 1/35*** | (2006.01) |
| ***F41A 9/72*** | (2006.01) |
| ***F41A 35/00*** | (2006.01) |
| ***G08B 21/02*** | (2006.01) |
| ***G08C 17/02*** | (2006.01) |
| *F21V 23/04* | (2006.01) |
| *F41H 13/00* | (2006.01) |

(52) U.S. Cl.
CPC ................ *F41A 35/00* (2013.01); *F41A 9/72* (2013.01); *F41G 1/35* (2013.01); *G08B 21/02* (2013.01); *G08C 17/02* (2013.01); *F21V 23/0407* (2013.01); *F41H 13/0087* (2013.01)

(58) Field of Classification Search
CPC .................................. F41G 1/35; F41C 27/00
See application file for complete search history.

(56) References Cited

U.S. PATENT DOCUMENTS

| | | | | |
|---|---|---|---|---|
| D274,926 | S | 7/1984 | Giragosian | D22/104 |
| 4,936,037 | A | 6/1990 | Holcomb et al. | F41C 27/00 |
| 5,183,951 | A | 2/1993 | Bilodeau | F41C 27/00 |
| 6,363,647 | B2 | 4/2002 | Kaminski | F41A 17/063 |
| 7,032,342 | B2 | 4/2006 | Pikielny | F41A 9/65 |
| 7,509,767 | B2 | 3/2009 | Bolen | F41A 9/61 |
| 8,661,723 | B2 | 3/2014 | Emde et al. | F41A 23/22 |
| 9,135,794 | B1 | 9/2015 | Anderson et al. | F21S 8/032 |
| 9,354,011 | B2 | 5/2016 | Cooke et al. | F41A 17/063 |
| 10,048,030 | B2 | 8/2018 | Corco | F41A 9/65 |
| 10,295,294 | B2 | 5/2019 | Righi et al. | F41A 35/00 |
| 10,413,839 | B2 | 9/2019 | Gutierrez et al. | G61J 1/02 |
| 10,890,415 | B2 | 1/2021 | Kapogianis et al. | F41C 27/00 |

(Continued)

*Primary Examiner* — J. Woodrow Eldred
(74) *Attorney, Agent, or Firm* — Jonathan A. Bay

(57) ABSTRACT

A premise-security system is disclosed combining a user-carried firearm with a remote light or lighting effect intended to be switched ON by the user who is bearing the firearm all the while the user poses a defensive posture, and causing the light/lighting effect to switch ON all while not dropping the defensive posture to a vulnerable posture, on a given self-defense occasion (eg., an after-dark home break-in home invasion by an intruder. The firearm is equipped with a manual switch module that has a switch, a power supply and wireless communications transmission circuits and components which, in response to manual activation of the switch, propagate a wireless communication or signal that causes the remote light or lighting effect to switch ON. The light and/or lighting effects are designed and disposed to provide the homeowner/resident/user to hide in darkness or shadows while brightly illuminating, dazzling, confusing and/or blinding the intruder.

3 Claims, 12 Drawing Sheets

(56) References Cited

U.S. PATENT DOCUMENTS

| | | | | |
|---|---|---|---|---|
| 11,069,227 | B1 | 7/2021 | Hubatka | G08C 17/02 |
| 2002/0069570 | A1 * | 6/2002 | Lee | F41A 7/08<br>42/70.11 |
| 2023/0168067 | A1 * | 6/2023 | Ross | H04W 4/10<br>42/146 |

* cited by examiner

REMOTE LIGHT ACTIVATION FROM SIDE ARM

CROSS-REFERENCE TO PROVISIONAL APPLICATION(S)

This application claims the benefit of U.S. Provisional Application No. 63/311,972, filed Feb. 19, 2022 and U.S. Provisional Patent Application No. 63/320,731, filed Mar. 17, 2022. The foregoing patent disclosure(s) is(are) incorporated herein by this reference thereto.

BACKGROUND AND SUMMARY OF THE INVENTION

The invention relates to home security or otherwise security over a protected premise and, more particularly, to remote light activation from a self-defense weapon like a side arm (eg., pistol), rifle, shotgun and so on, or from a wearing apparel accessory like a wrist watch while a user is bearing a firearm in a defensive posture.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
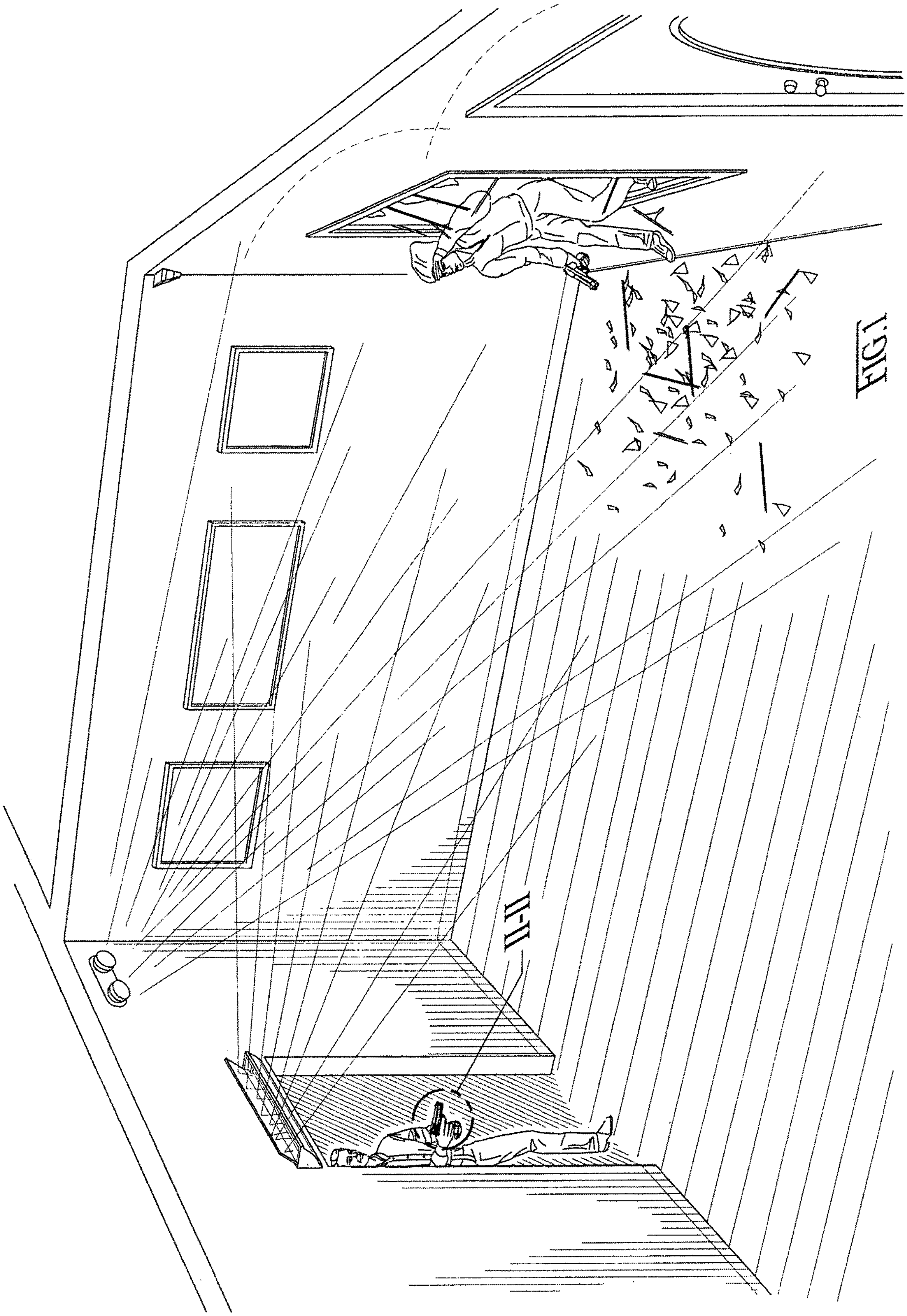
FIG. 1 is a perspective view of an exemplary self-defense environment and self-defense occasion (eg., an after-dark home break-in home invasion by an intruder), wherein a homeowner/resident/user is countering the home invasion with a side arm provided with electronic devices and circuits comprising at least a manual switch, power supply and a wireless transmitter housed in a module in accordance with the invention.
Figure 2:
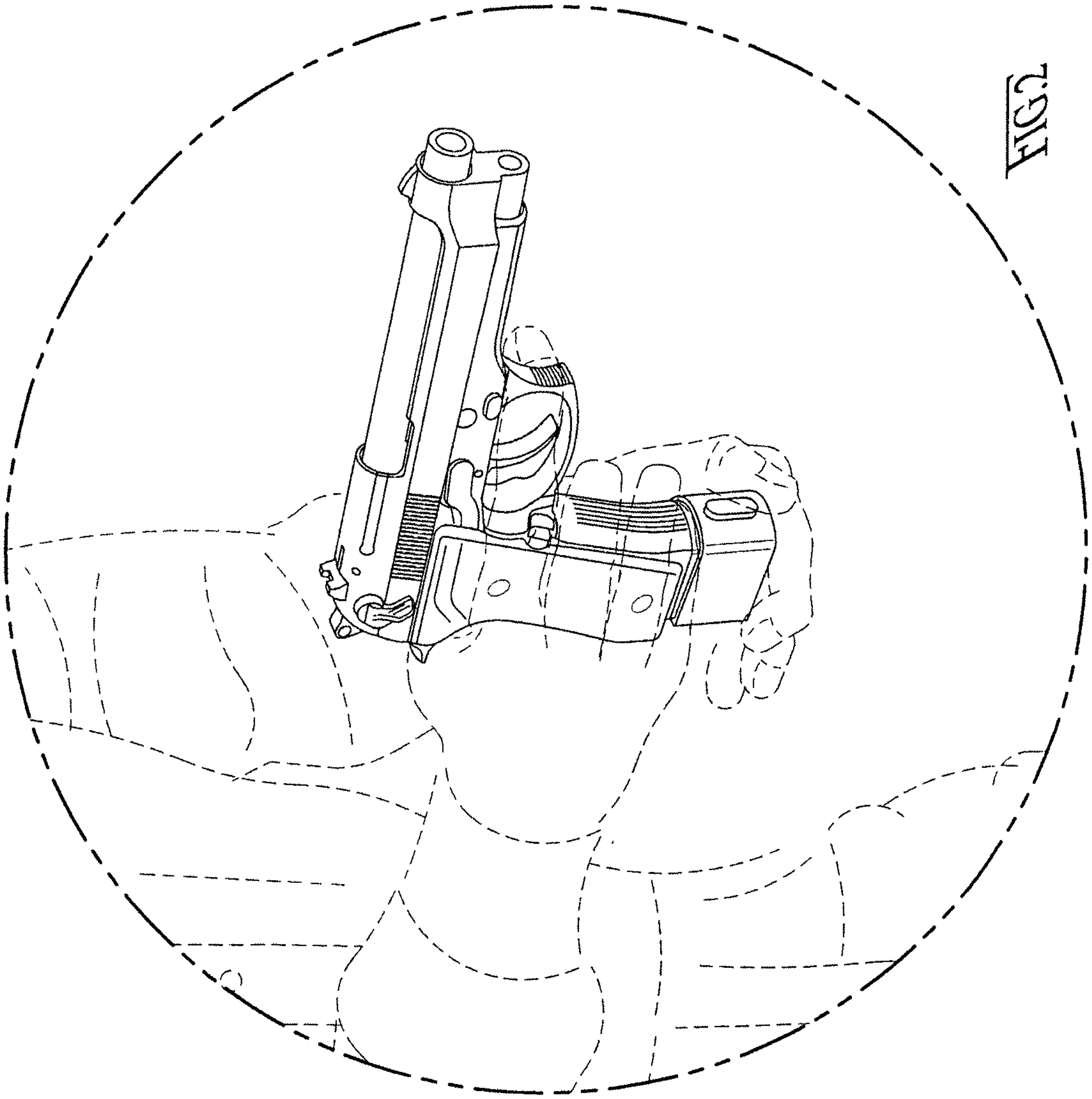
FIG. 2 is an enlarged-scale perspective view of detail II-II in FIG. 1.
Figure 3:
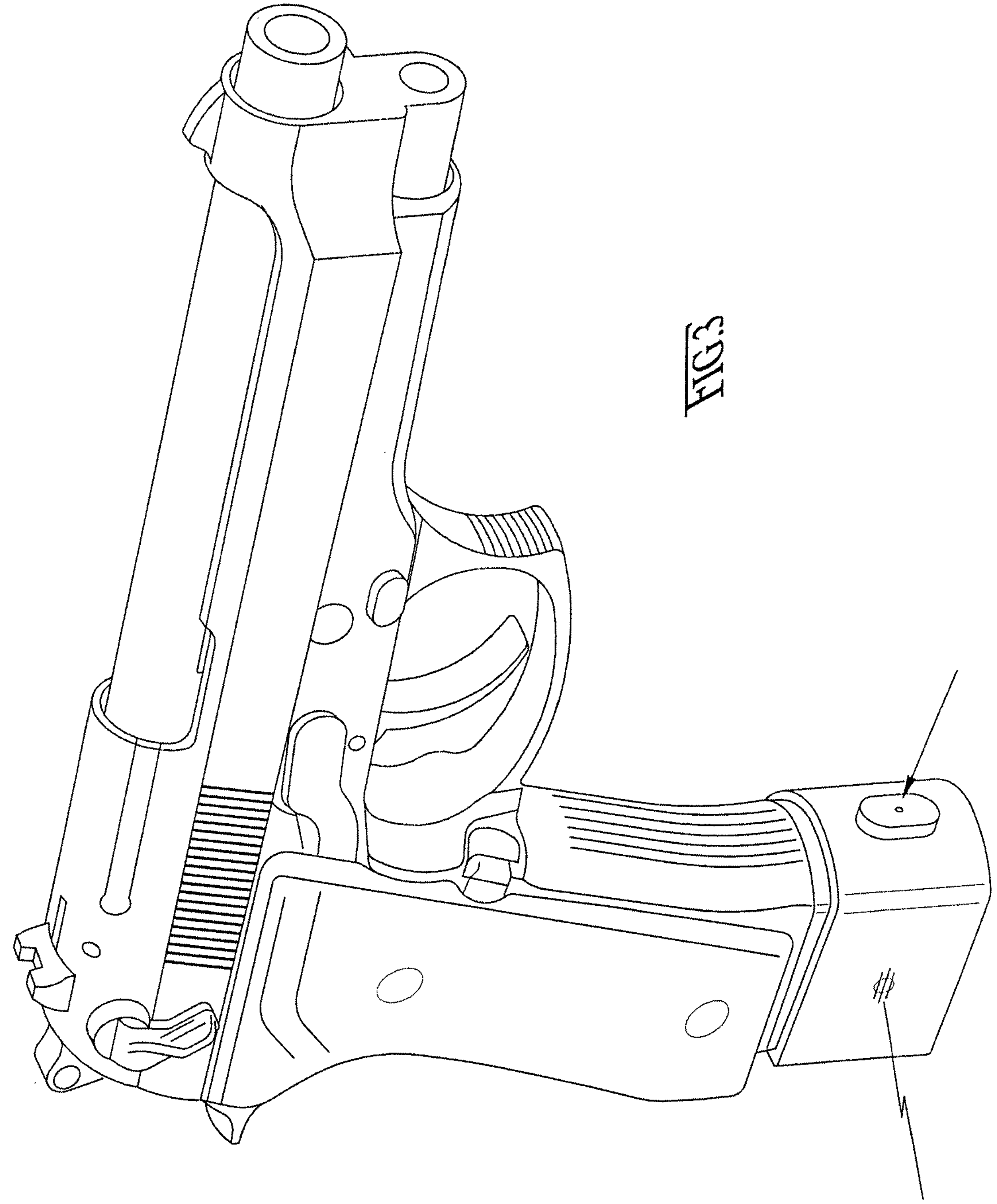
FIG. 3 is perspective view comparable to FIG. 2 and comprising another step-up in enlargement, and better showing the module provided with the manual switch (eg., a first embodiment of a manual switch module in accordance with the invention) as well as the side arm, wherein the floor plate of the magazine tube for the side arm is replaced with (or equipped with) the manual switch module in accordance with the invention.

FIGS. 1-3 show a first embodiment of a manual switch module in accordance with the invention for remote activation of self-defense measures for protecting a protected premise.

FIG. 1 shows an exemplary self-defense environment and self-defense occasion (eg., an after-dark home break-in home invasion by an intruder), wherein a homeowner/resident/user is countering the home invasion with a side arm provided with first embodiment of a manual switch module in accordance with the invention for remote activation of self-defense measures for protecting a protected premise (ie., the home).

The self-defense measures can comprise any of activation/de-activation of lights (or lighting, alarm and/or siren effects) adapted for the purposes in accordance with the invention to be switched among modes comprising any of ON, OFF, FLASH, STROBE, TRIGGER SIREN, TRIGGER ALARM to a central alarm-monitoring station and so on, from the remote distance that the module, side arm and user are remotely spaced away from the subject lights, lighting or other effects.

For example, a home alarm system might detect the original instance of the home invasion by any of breaking glass sensors, motion sensors, door opening sensors and so on. The user can then manually take control of various self-defense measures by means of the manual switch module on the floor plate of the magazine tube for the side arm. The manual switch module has a switch, a power supply, and a wireless transmission technology (eg., RF or radio frequency) transmitter for propagating a signal.

Figure 9:
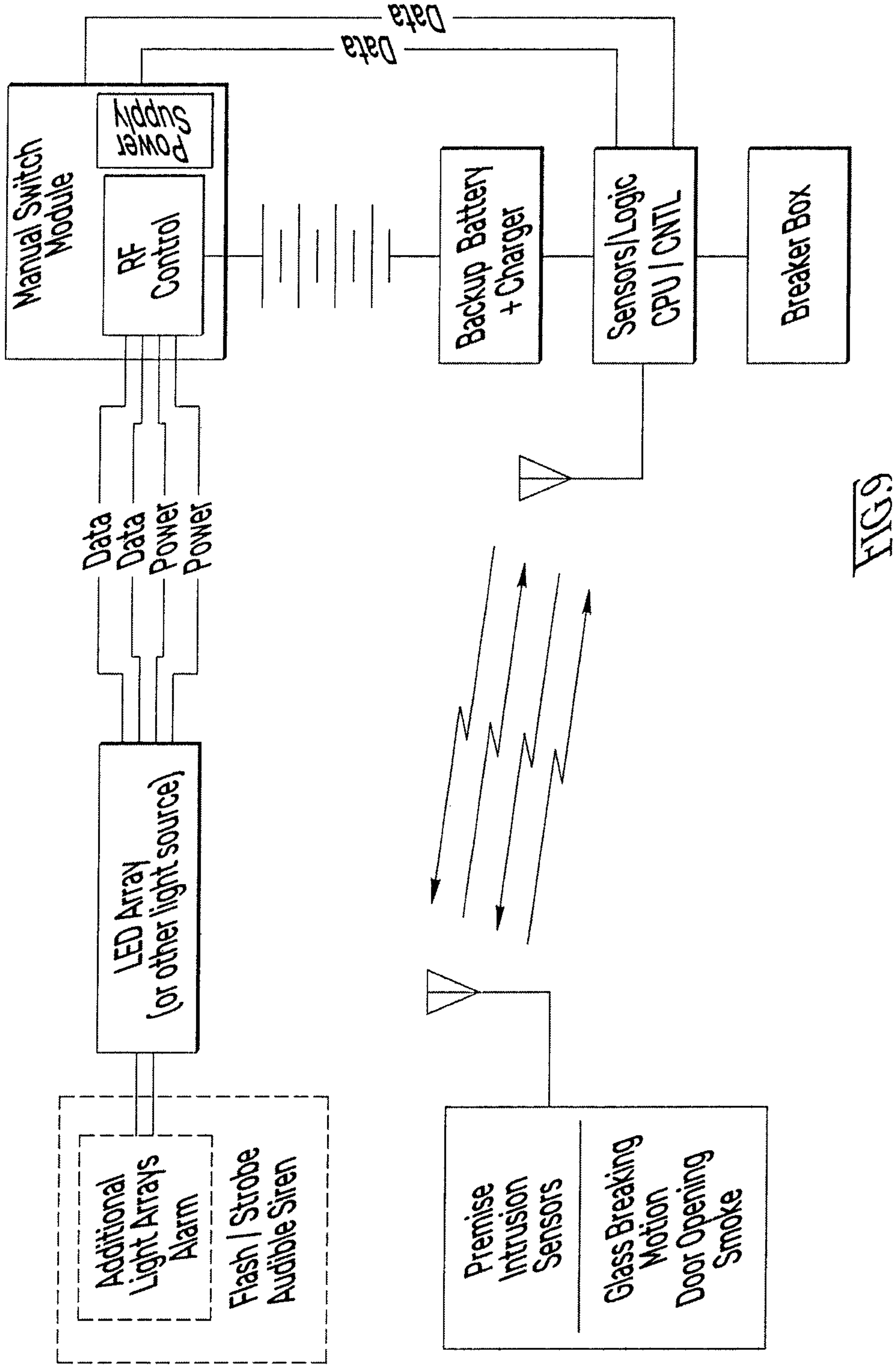
FIG. 9 is a block diagram schematic showing a manual switch module in accordance with the invention networked into a network of various of network devices having various roles to fulfill for the purposes of the invention.

FIGS. 3 and 9 show exemplary wireless communication transmission paths.

In FIG. 1, the spot lights and the LED light bar aimed at the front wall of the room can have their own independent RF receivers tuned for receiving the signal from the manual switch module and, in response, switch ON. More accurately, for the LED light bar, it is aimed up and reflected out toward the front wall by an angled mirror. One purpose of that might be to keep the homeowner/resident/user in shadows, which his or her pseudo-version of a cloak of invisibility. The LED light bar might even FLASH or STROBE to further confuse and blind the intruder. Indeed, in FIG. 1, the intruder is shielding his with his left hand (he too is wielding a side arm and he is shielding his eyes with his off hand).

It is a further aspect of the invention that the angled mirror might be a wedge of a cylindrical surface in order to cast a wide-pattern illumination array of LED's.

The RF signal propagated by the manual switch module might alternatively be received by a local control panel (see FIG. 9) which might launch a more elaborate series of responses. For example, the control panel might switch all other lighting in or around the premise—other than the selected light effects in FIG. 1 of the LED light bar and the spot lights—to OFF. In other words, any non-selected lights/lighting effects that were ON before the signal are switched OFF, and just the selected lights/lighting effects are switched ON (presumably, as they are bright and are intended to blind, they would have been switched OFF).

The control panel can further switch ON sirens. The LED light bar need not be white alone, but have as many colors and flashing color sequences as any LED light bar on an LEO patrol car (law enforcement officer).

FIG. 1 further shows that, for the homeowner/resident/user, he or she benefits from the blinding light array and effects by secreting him or herself in shadows, all while bearing the side arm in a defensive posture.

Figure 4:
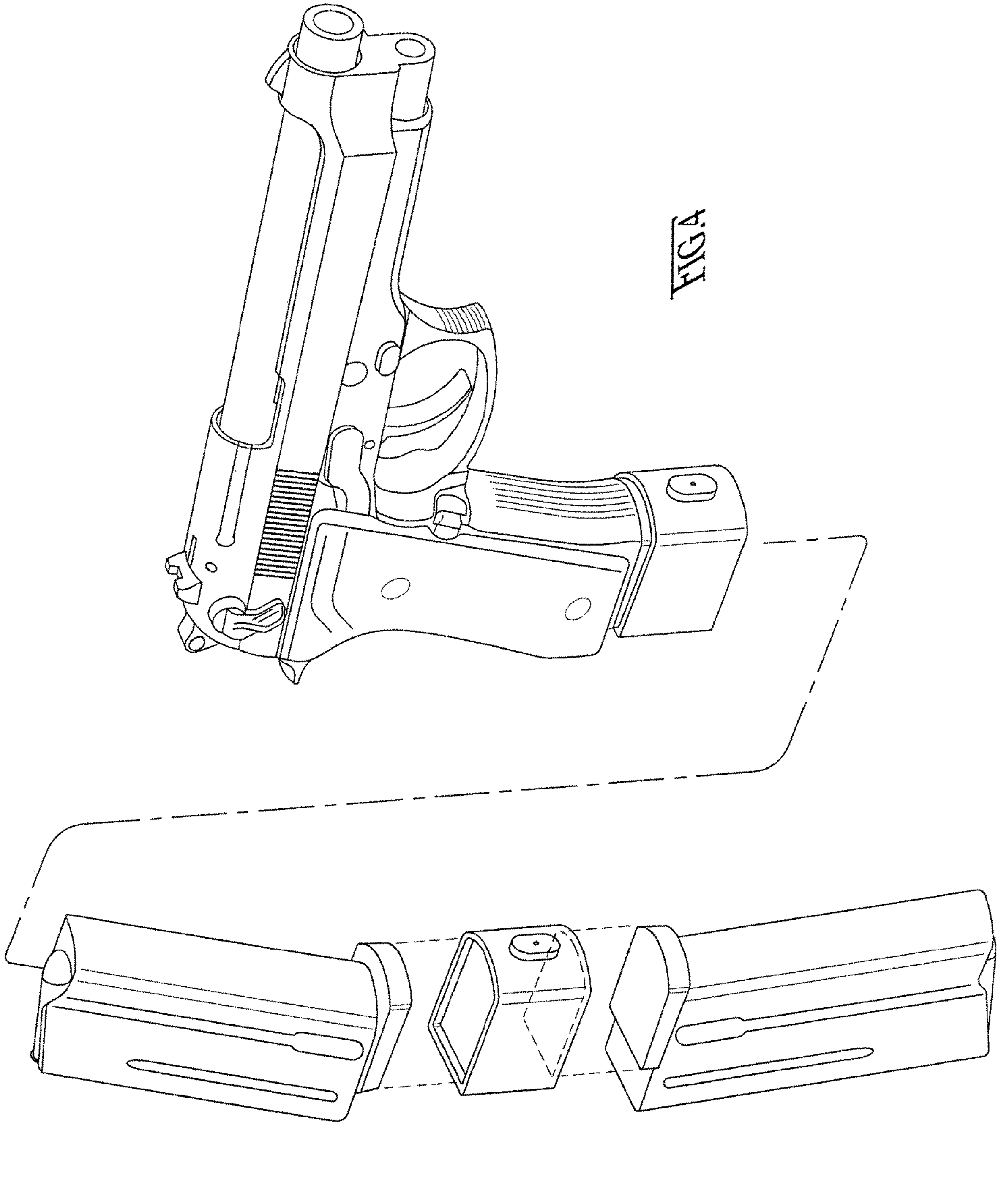
FIG. 4 is a perspective view comparable to FIG. 3 except showing a second embodiment of a manual switch module in accordance with the invention.

FIG. 4 shows a second embodiment of a manual switch module in accordance with the invention, comprising a sliding collar adapted for insertion of a magazine tube for a side arm therethrough and furthermore adapted to slide elevationally in opposite directions (eg., up and down) on the outside of the magazine tube.

Figure 5:
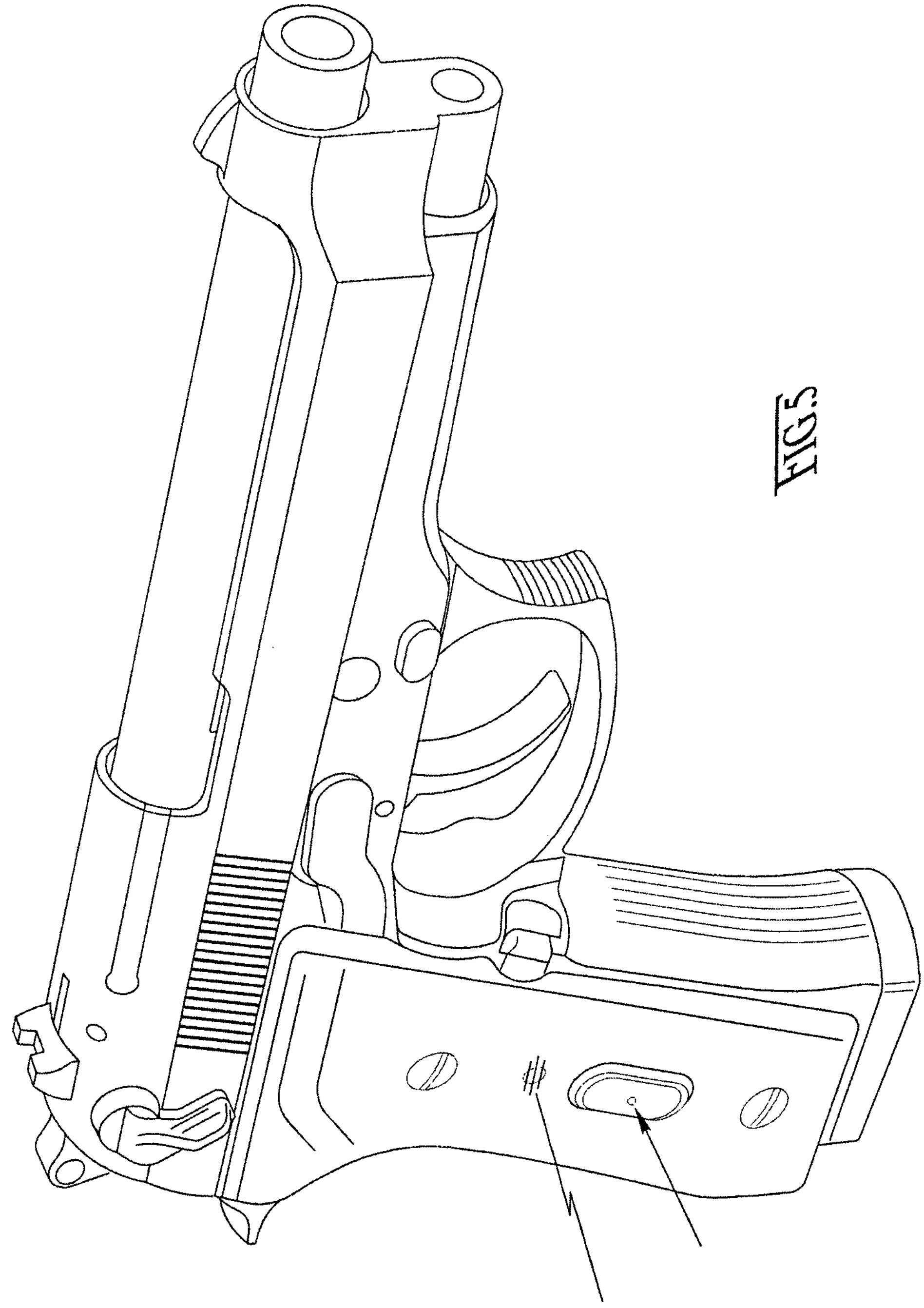
FIG. 5 is a perspective view comparable to FIGS. 3 and 4 except showing a third embodiment of a manual switch module in accordance with the invention wherein the manual switch, power supply and a wireless transmitter circuit devices and components are housed in a flat thin module adapted to attach as a veneer panel on one side of the grip of the side arm.

FIG. 5 shows a third embodiment of a manual switch module in accordance with the invention wherein the manual switch, power supply and a wireless transmitter circuit devices and components are housed in a flat thin module adapted to attach as a veneer panel on one side of the grip of the side arm.

Figure 6:
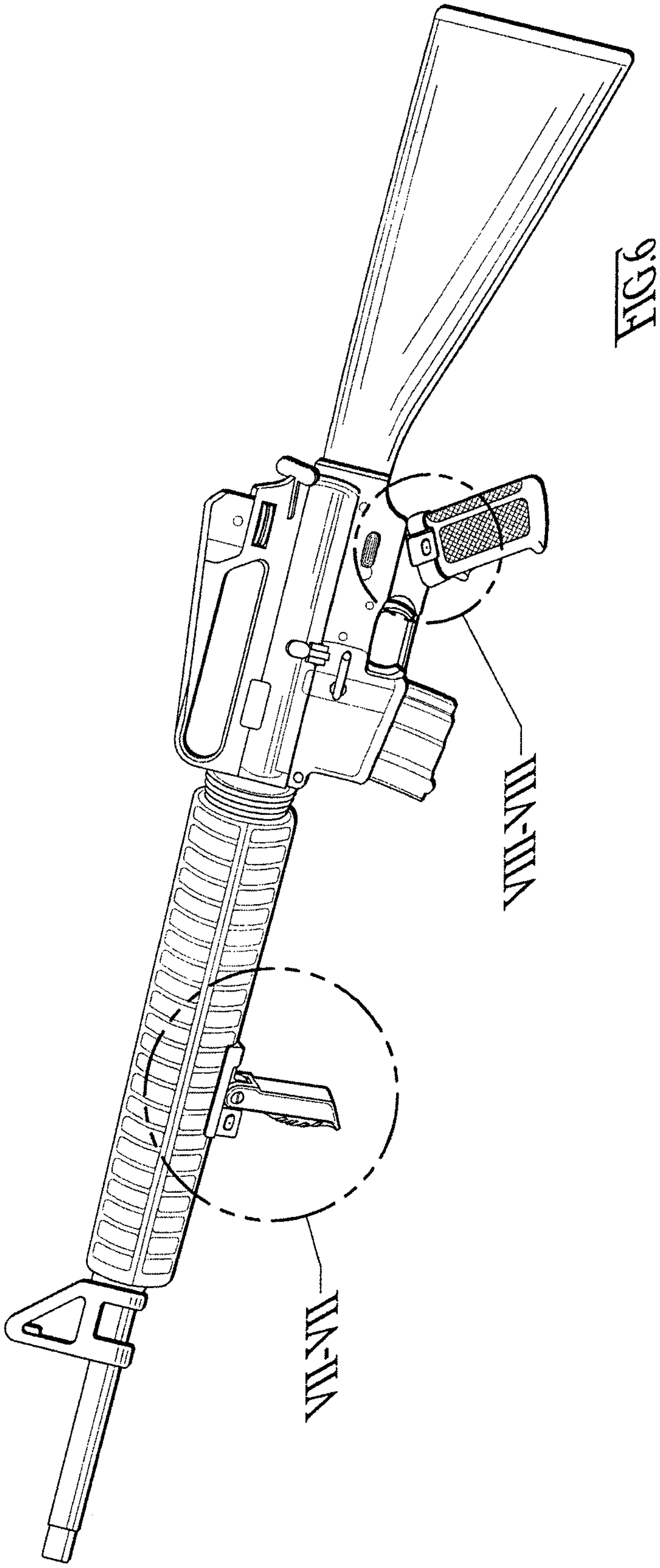
FIG. 6 is a perspective view of an AR-15 style firearm provided with a fourth and fifth embodiment of a manual switch module in accordance with the invention.
Figure 7:
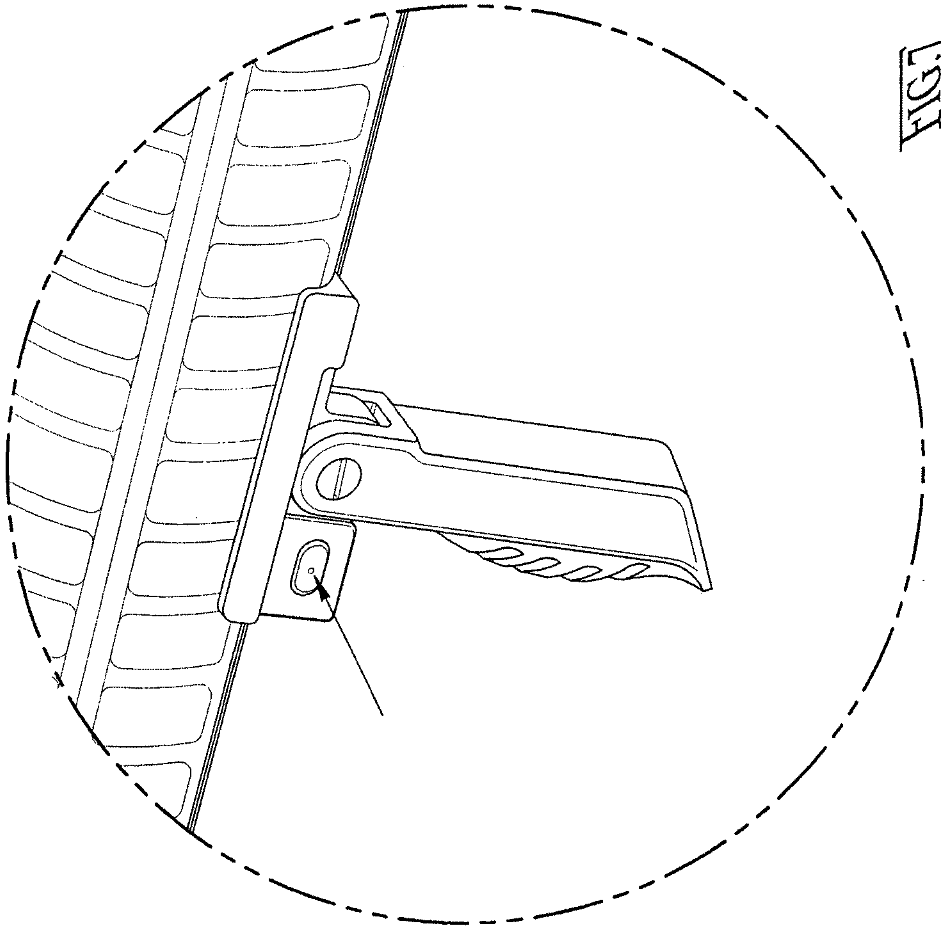
FIG. 7 is an enlarged-scale perspective view of detail VII-VII in FIG. 6, better showing the fourth embodiment of a manual switch module in accordance with the invention.
Figure 8:
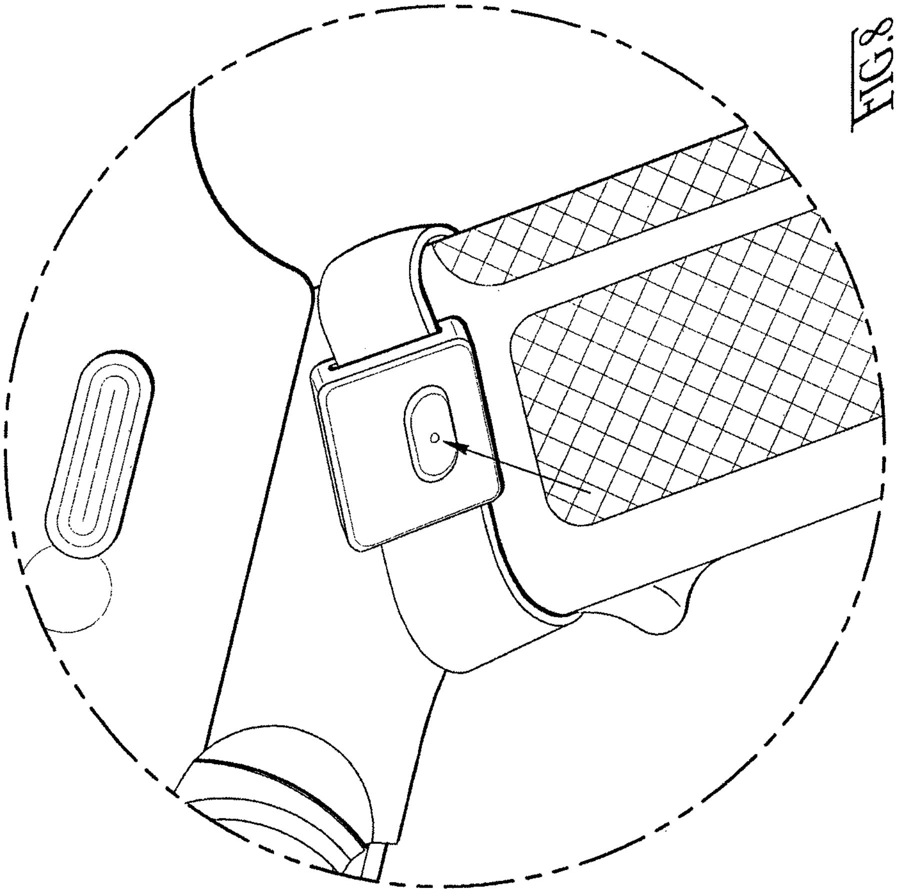
FIG. 8 is an enlarged-scale perspective view of detail VIII-VIII in FIG. 6, better showing the fifth embodiment of a manual switch module in accordance with the invention.

FIG. 6 shows, not a side arm anymore but, an AR-15 style firearm provided with a fourth and fifth embodiment of a manual switch module in accordance with the invention. FIG. 7 is a detail showing better the fourth embodiment of the manual switch module in accordance with the invention. The manual switch module is disposed in proximity of a vertical foregrip for activation by the user's forehand. FIG. 8 is a detail VIII-VIII showing better the fifth embodiment of the manual switch module in accordance with the invention. Here, the manual switch module is disposed in proximity of the pistol grip for activation by the user's trigger hand.

FIG. 9 is a block diagram schematic showing a manual switch module in accordance with the invention networked into a network of various of network devices having various roles to fulfill for the purposes of the invention.

In FIG. 9, there is a programmable (or at least customizable) network operation logic for a premise security network in accordance with the invention, including assignment of:

(1) role structure in the network (eg.,
- (a) a command base comprising programmable/customizable instruction logic control, which logic is set-up at an original instance and then left relatively alone until new assignments are desired to be made/changed),
- (b) senders of instruction (eg., user and manual switches);
- (c) receivers and operators on instructions (eg., eg, lights and so on), and
- (d) network radio frequency channels with modulation/demodulation security enhancements.

Figure 11:
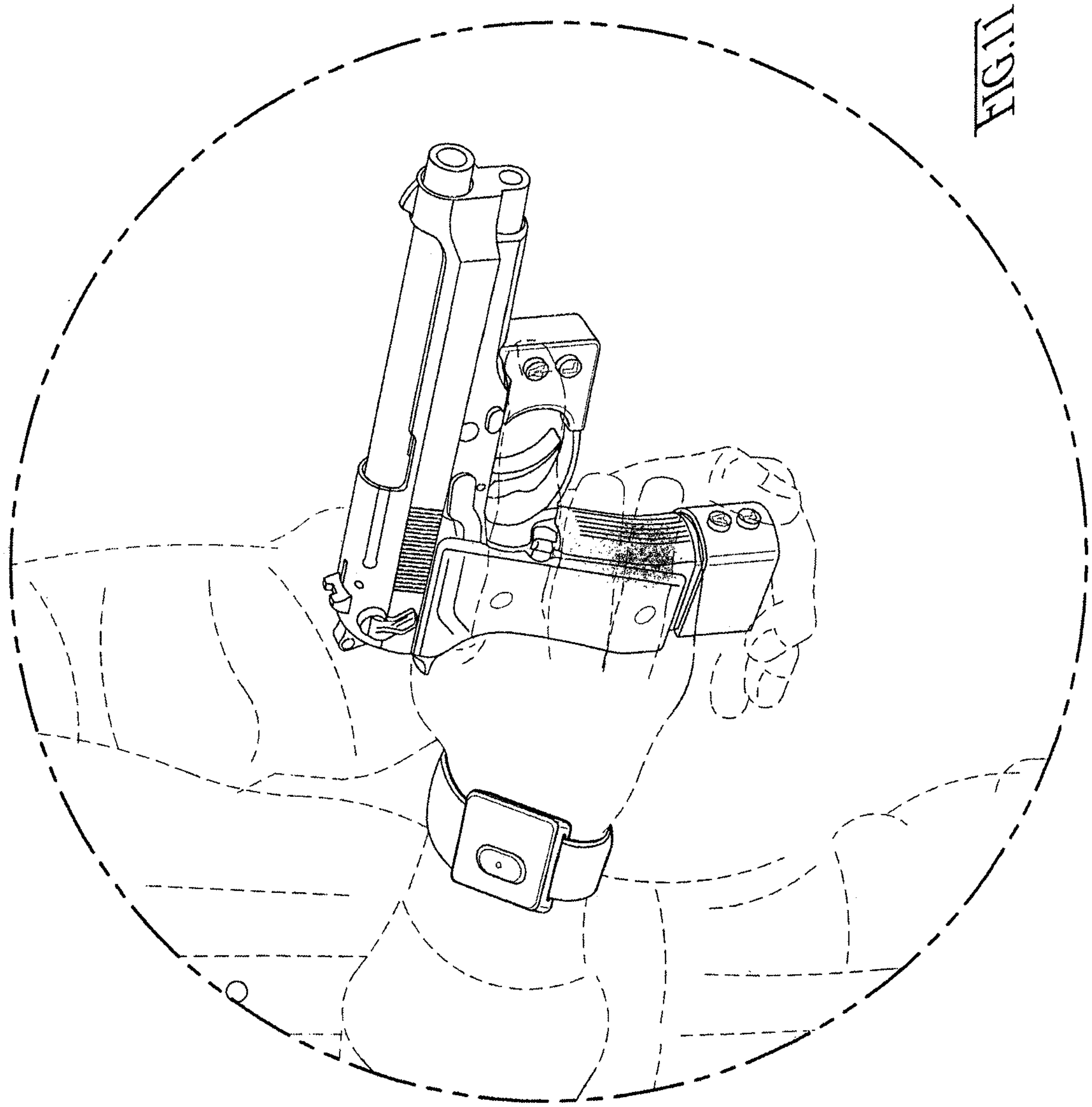
FIG. 11 is an enlarged-scale perspective view of detail XI-XI in FIG. 10, and comparable to FIG. 2 except wherein the user is wearing a wrist watch or wrist band moreover thereby functioning as the sixth embodiment of the manual switch in accordance with the invention whereby a user can remotely activate lights or lighting, siren or alarm effects for purposes of the invention: —while the user is bearing a firearm in a defensive posture.
Figure 12:
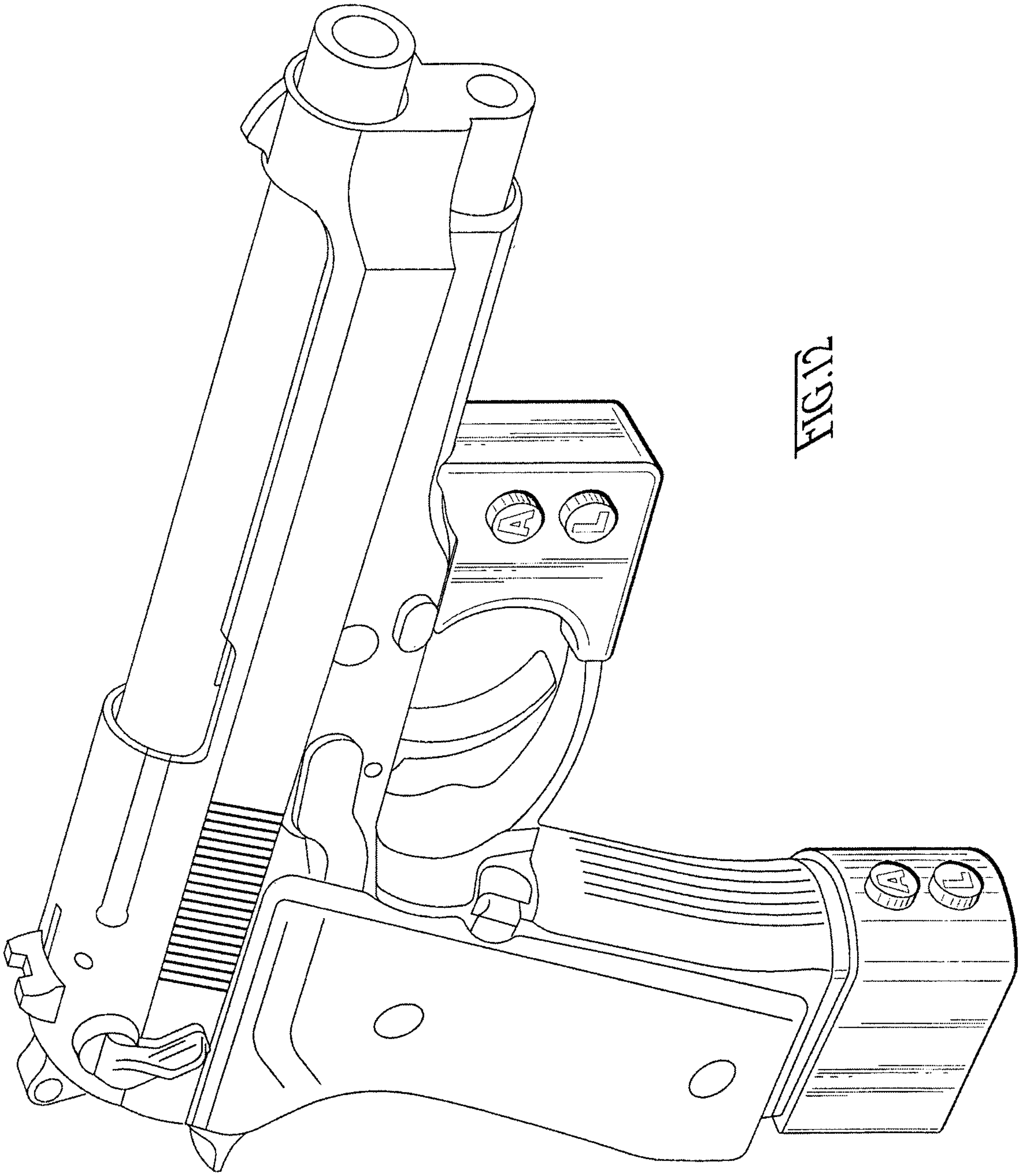
FIG. 12 is a furthermore enlarged-scale perspective view of FIG. 11 except showing the seventh and eighth embodiments of the manual switch module in accordance with the invention in enlarged detail.

The manual switch module in accordance with the invention is preferably (though not exclusively) supplied with a rechargeable power supply (rechargeable onboard battery) which can be recharged by wireless charging (eg., by magnetic fields). Additionally, the manual switch module might have some basic control circuitry (or even CPU) that can receive instructions from the control panel. That way, as seen in FIGS. 11 and 12, when the homeowner/resident/user is offered the sixth, seventh and eight embodiments of a manual switch module in accordance with the invention, which low at least five switches (and which number can readily be expanded above that number), the different switches might be configured (programmed) to result in different outcomes.

Preferably a programming/instruction-coding session between the control panel and any given manual switch module in accordance with the invention is also accomplished by wireless communication (eg., RFID technology). The programming/instruction-coding protocols uploaded to any given manual switch module in accordance with the invention might dictate a protocol for how use of the switch changes the different outcomes, for example such steps as:

1—press the button and immediately release—Outcome A,

2—press the button and immediately release twice in a row—Outcome B,

3—press and hold the button—Outcome C until the button is released,

4—after some pause after steps 1 or 2, press the button and immediately release—comprises a RESET and switches OFF the Outcomes A or B (eg., preferably switches OFF all the defense measures), and so on.

Figure 10:
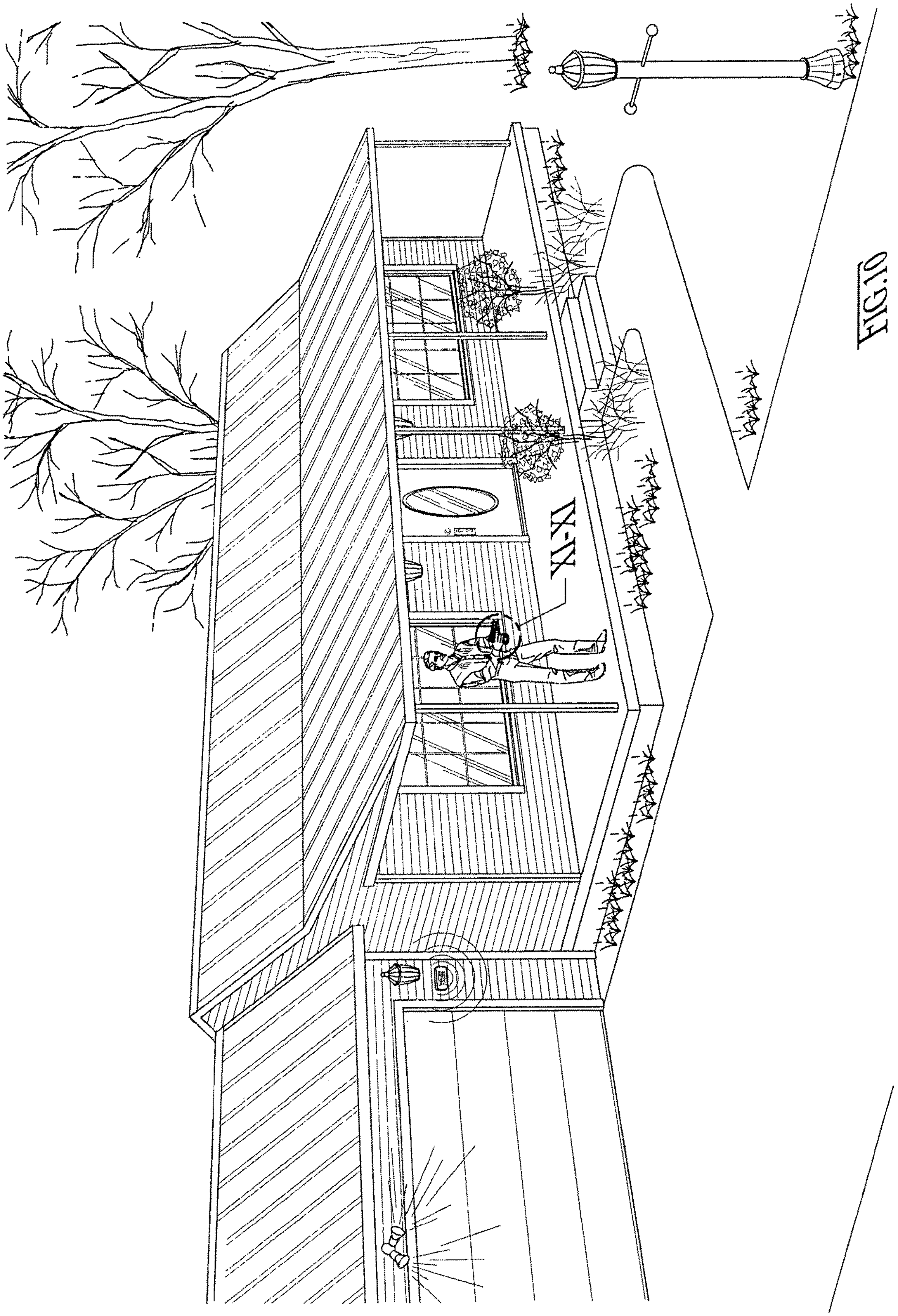
FIG. 10 is a perspective view comparable to FIG. 1 except of an alternate exemplary protected-premise defense environment and self-defense occasion (eg., another after-dark occasion wherein a home residence under a suspected out-of-doors harmful threat encroachment), and here the lawfully-recognized defender/homeowner/resident/user is countering the protected-premise threat with a side arm provided with a sixth, seventh and eight embodiment of a manual switch module in accordance with the invention.

FIG. 10 is comparable to FIG. 1 except showing an alternate exemplary protected-premise defense environment and self-defense occasion, eg., another after-dark occasion wherein a home residence under a suspected out-of-doors harmful threat encroachment).

Here the lawfully-recognized defender/homeowner/resident/user is countering the protected-premise threat with a side arm provided with the sixth, seventh and eight embodiment of a manual switch module in accordance with the invention.

FIG. 11 shows better that the user is wearing a wrist watch or wrist band moreover thereby functioning as the sixth embodiment of the manual switch in accordance with the invention. Instead of this being a wrist watch, it can be a wrist band with hook-and-pile fastening means ("VELCRO" ®). Thus, the user can remotely activate lights or lighting, siren or alarm effects for purposes of the invention: —all while the user is bearing a firearm in a defensive posture.

FIG. 12 shows better the seventh and eighth embodiments of the manual switch module in accordance with the invention in enlarged detail. The variety of locations among FIGS. 11 and 12 afford the user the selection of the most comfortable switch to activate, and/or a selection of different modes of results (outcomes) by resort to the different switches.

These and other aspects and objects are provided according to the invention characterized for example and non-exclusively by the following.

One. Premise-security system comprising a combination of (1) a manually carried and operated projectile projector with (2) a remote operative device having plural STATES which can be switched between at least a STATE ONE and a STATE TWO by supply of an electric control signal; said apparatus comprising:

- a manually carried and operated projectile projector;
- a manual switch module comprising a manual switch, a power supply, and circuits for propagating a wireless communication upon activation of the manual switch;
- wherein the manually carried and operated projectile projector is equipped with the manual switch module; and
- a remote operative device having plural STATES which can be switched between at least a STATE ONE and a STATE TWO by supply of an electric control signal that is directly or indirectly responsive to the wireless communication propagated by the manual switch module.

Two. The premise-defense security system of One, wherein:

- the manual switch module is disposed on or at a location on or in the manually carried and operated projectile projector where a user can comfortably and effectively bear the projectile projector all the while being capable of activating the switch without shifting to a vulnerable posture.

Three. The premise-defense security system of Two, wherein:

- the manually carried and operated projectile projector comprise a side arm.

Four. The premise-defense security system of Three, wherein:

- the side arm comprises a magazine tube having a floor plate; and
- the manual switch module either replaces or equips the floor plate with said manual switch module.

Five. The premise-defense security system of Three, wherein:

- the side arm comprises a magazine tube, and
- the manual switch module comprises a sliding collar adapted for insertion of the magazine tube therethrough to slide elevationally in opposite directions on the outside of the magazine tube.

Six. The premise-defense security system of Three, wherein:

- the side arm has a hand grip (pistol grip) having spaced sides; and
- the manual switch module comprises a flat thin housing for the manual switch, power supply and the wireless transmitter circuit devices and components, and which housing is adapted to attach as a veneer panel on one side of the grip of the side arm.

Seven. The premise-defense security system of Three, wherein:

- the side arm has a trigger and hand grip (pistol grip) extending between a top and bottom; and
- the manual switch module is adapted to be located at the top of the hand grip and rear of the trigger.

Eight. The premise-defense security system of Three, wherein:

- the side arm has a trigger, trigger guard and hand grip (pistol grip) extending between a top and bottom; and
- the manual switch module is adapted to be located at an elevation comparable with the top of the hand grip and forward of the trigger guard.

Nine. The premise-defense security system of Three, wherein:

- the manual switch module further comprises another manual switch thereby giving the manual switch module at least two manual switches.

Ten. The premise-defense security system of Two, wherein:

- the manually carried and operated projectile projector comprise a rifle.

Eleven. The premise-defense security system of Ten, wherein:

- the rifle further comprises a forestock that has a vertical foregrip; and
- the manual switch module's location is disposed in proximity of the vertical foregrip for activation by a user's forehand.

Twelve. The premise-defense security system of Ten, wherein:

- the rifle has a trigger and hand grip (pistol grip) extending between a top and bottom; and
- the manual switch module's location is disposed at the top of the hand grip and rear of the trigger.

Thirteen. The premise-defense security system of Ten, wherein:

- the manual switch module further comprises another manual switch thereby giving the manual switch module at least two manual switches.

Fourteen. The premise-defense security system of One, wherein:

- the manual switch module further comprises another manual switch thereby giving the manual switch module at least two manual switches.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. Premise-security system comprising a combination of (1) a manually carried and operated projectile projector with (2) an operative device having plural STATES which can be switched between at least a STATE ONE and a STATE TWO by supply of an electric control signal; said system comprising:

- the manually carried and operated projectile projector;
- a manual switch module comprising a manual switch, a power supply, and circuits for propagating a wireless communication upon activation of the manual switch;
- wherein the manually carried and operated projectile projector is equipped with the manual switch module; and
- the operative device, which comprises any of a light, a lighting effect, a siren or an alarm;
- wherein the operative device is remotely located and remotely operated, and has the plural STATES which can be switched between at least the STATE ONE and the STATE TWO by supply of an electric control signal that is responsive to the wireless communication propagated by the manual switch module;

wherein the manual switch module is disposed at a location on or in the manually carried and operated projectile projector where a user can comfortably and effectively bear the projectile projector all the while being capable of activating the switch;

wherein the manually carried and operated projectile projector comprise a side arm;

wherein the side arm comprises a magazine tube, and the manual switch module comprises a sliding collar adapted for insertion of the magazine tube therethrough to slide elevationally in opposite directions on the outside of the magazine tube.

2. The premise-defense security system of claim 1, wherein:

the magazine tube has spaced sides; and the manual switch module comprises a flat thin housing for the manual switch, power supply and the wireless transmitter circuit devices and components, and which housing is adapted to attach as a veneer panel on one side of the magazine tube of the side arm.

3. The premise-defense security system of claim 1, wherein:

the manual switch module further comprises another manual switch thereby giving the manual switch module at least two manual switches.

* * * * *